Patented Dec. 20, 1938

2,140,878

UNITED STATES PATENT OFFICE 2,140,878

PRESERVATION OF TIMBER

Rebecca Lurie, Johannesburg, Union of South Africa

No Drawing. Application March 9, 1935, Serial No. 10,341. In the Union of South Africa March 31, 1934

5 Claims. (Cl. 134—78.6)

The present invention relates to the treatment of timber and particularly mine timber in order to protect it against fungal growths.

The object of the invention is to provide a method which can be carried out in a single treatment, in which the preservative is highly toxic to fungi and is substantially non-leachable by water.

Zinc fluoride is included in published lists of fluorides which it is stated can be used as timber preservatives; but so far as applicant is aware zinc fluoride has not been actually used for this purpose nor has a method of so using it been proposed. It is so slightly soluble in water that it is impracticable to impregnate timber with a plain aqueous solution of it. If the attempt is made to produce it in the wood cells by impregnating the timber alternately with a soluble fluoride and with a soluble zinc salt, the process is brought to an end before adequate impregnation occurs, because very soon after the application of the second reagent solution is commenced, a barrier of the virtually insoluble zinc fluoride is formed which prevents penetration of said second reagent solution.

According to the present invention, a treatment liquor is prepared by bringing about interaction in solution, without the application of heat, between a soluble fluoride and at least sufficient of a soluble zinc salt to convert most of the soluble fluoride into zinc fluoride, interaction being effected, in the presence of an organic substance which prevents, in the cold, precipitation of zinc fluoride. The procedure is carried out at normal temperature, because, as applicant has found, zinc fluoride becomes increasingly insoluble as the temperature is raised.

The zinc salt is preferably zinc sulphate. This substance is regularly produced as a by-product in the cyanide process for the extraction of precious metals. It is itself commonly used at present as a wood preservative. Its utility in this respect is, however, greatly increased when it is employed as a constituent for the production of zinc fluoride, since the toxicity of the latter is many times greater than that of the sulphate. As the source of fluorine it is convenient to use sodium fluoride, since it is readily obtainable and the sodium sulphate resulting from it is itself a fungicide. It is desirable that the normal sodium fluoride should be used.

Substances suitable for preventing the precipitation of the zinc fluoride include carboxylic acids, such as acetic acid, and aromatic nitro compounds such as dinitrophenol. The latter substance is preferred because it is found to be very effective for the purpose and is, itself, a fungicide.

The preparation of the solution is so effected that precipitation of the desired reaction product viz. zinc fluoride, is avoided; since it is found that, once precipitated, it can only with difficulty be brought back into solution. If the attempt is made to dissolve all three substances together, such precipitation occurs. A separate solution of each substance may therefore be prepared and the three solutions mixed together. The dinitrophenol requires somewhat prolonged heating to bring it into solution. However its dissolution may be accelerated if it is dissolved together with the sodium fluoride; the solution of these two substances being cooled and subsequently added to a separate solution of the zinc sulphate.

Suitable proportions are:

|  | Pounds |
|---|---|
| $ZnSO_4.7H_2O$ | 2.25 |
| Normal sodium fluoride | 0.66 |
| Dinitrophenol | 0.09 |
| Water | 100 |

With these proportions there is enough zinc sulphate present to react with about 99.6% of the sodium fluoride present so as to produce, in the timber, a sufficient quantity of the effective fungicidal agent viz. zinc fluoride.

The zinc fluoride solution having been thus prepared, the timber is impregnated with it in any usual manner. The solution is applied cold to the timber, for the same reason that it is prepared in the cold. The impregnation is preferably effected under pressure; a pressure of 75 lbs. per square inch being found suitable for the kinds of timber used in the Witwatersrand mines. Under these circumstances adequate impregnation of the timber can be attained in a single treatment.

The physical and chemical action of the wood upsets the equilibrium of the solution applied to it, and the wood reacts with the dinitrophenol or other precipitation inhibitor so that the latter is no longer effective to maintain the zinc fluoride in solution. Insoluble zinc fluoride is accordingly disseminated in the timber, as can be ascertained by inspection of the treated timber.

The treated timber is thus non-leachable by moisture; and is moreover tightly resistant to the most destructive organisms occurring in the Witwatersrand mines. If the zinc sulphate used is that produced as a by-product of the cyanide process, the cost of the treatment is low as compared with known treatment methods of high efficiency.

I claim:

1. The process of manufacturing a timber preservative which comprises mixing a solution of a zinc salt and a solution of a fluoride with a solution of dinitrophenol, without heating, the zinc salt being present in sufficient quantity to effect conversion of most of the soluble fluoride into zinc fluoride.

2. The process of manufacturing a timber preservative which comprises mixing a solution of a zinc salt and a solution of normal sodium fluoride with a solution of dinitrophenol, without heating, the zinc salt being present in sufficient quantity to effect conversion of most of the soluble fluoride into zinc fluoride.

3. The process of manufacturing a timber preservative which comprises mixing a solution of zinc sulphate and a solution of a fluoride with a solution of dinitrophenol without heating, the zinc sulphate being present in sufficient quantity to effect conversion of most of the soluble fluoride into zinc fluoride.

4. The process of manufacturing a timber preservative which comprises mixing a solution of zinc sulphate and a solution of normal sodium fluoride with a solution of dinitrophenol, without heating, the zinc sulphate being present in sufficient quantity to effect conversion of most of the soluble fluoride into zinc fluoride.

5. The process of manufacturing a timber preservative which comprises the dissolution of normal sodium fluoride and dinitrophenol in the same solution with the application of heat, cooling said solution and mixing therewith a solution of zinc sulphate, the zinc sulphate being present in sufficient quantity to effect conversion of most of the soluble fluoride into zinc fluoride.

REBECCA LURIE.